United States Patent [19]

Arnold

[11] Patent Number: 5,279,204
[45] Date of Patent: Jan. 18, 1994

[54] FLUID OPERATED MECHANICAL POWER AMPLIFIER

[75] Inventor: Eugene W. Arnold, Des Moines, Wash.

[73] Assignee: Tuthill Corporation, Hinsdale, Ill.

[21] Appl. No.: 908,247

[22] Filed: Jul. 2, 1992

[51] Int. Cl.$^5$ .............................................. F15B 9/10
[52] U.S. Cl. .................. 91/376 R; 60/547.1; 60/591
[58] Field of Search ............ 91/370, 371, 372, 376 R; 60/547.1, 591, 592; 92/51, 52

[56] References Cited

U.S. PATENT DOCUMENTS

| | | | |
|---|---|---|---|
| 3,327,590 | 6/1967 | Johnson | 91/376 R |
| 3,596,564 | 8/1971 | Johnson | 91/376 R X |
| 3,747,473 | 7/1973 | Bach et al. | 91/376 R X |
| 3,951,043 | 4/1976 | Keady | 91/376 R X |
| 4,934,250 | 6/1990 | Siegel | 91/376 R X |

FOREIGN PATENT DOCUMENTS

| | | | |
|---|---|---|---|
| 629132 | 7/1921 | France | 91/376 R |

Primary Examiner—Edward K. Look
Assistant Examiner—Hoang Nguyen
Attorney, Agent, or Firm—Christensen, O'Connor, Johnson & Kindness

[57] ABSTRACT

A fluid-operated power booster includes a housing having a main piston slidably mounted therein and a regulating chamber formed in the main piston. A regulating piston is mounted within the regulating chamber and is fixed to an input shaft. The input shaft has a valve mounted on it so that movement of the input shaft and regulating piston in a first direction permits the flow of working fluid into both a working chamber and the regulating chamber, while movement of the input shaft in a second direction causes working fluid to be exhausted from the working chamber. The regulating piston is biased by a mechanical spring whose force must be overcome to initiate movement of the regulating piston and thereby the flow of working fluid to achieve booster action. The output of the device is by way of an output shaft connected to the main piston.

8 Claims, 1 Drawing Sheet

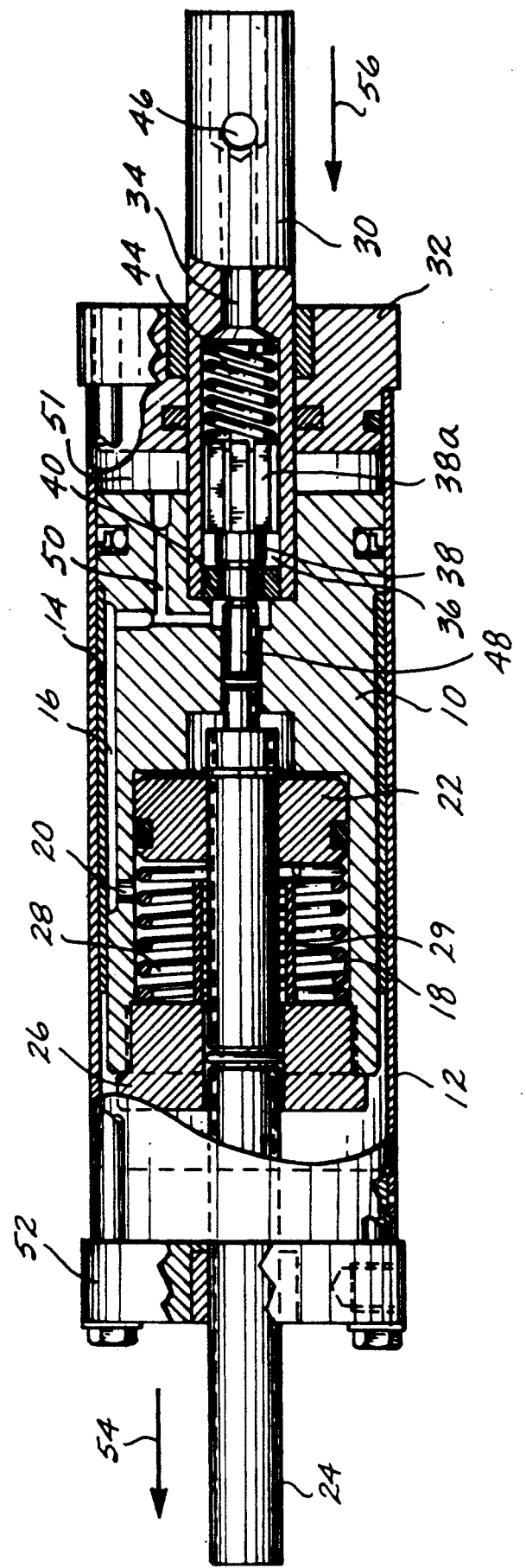

FLUID OPERATED MECHANICAL POWER AMPLIFIER

FIELD OF THE INVENTION

This invention relates to mechanical power amplification or boost mechanisms operated by pressurized fluid such as those in use in operating the clutch of a large truck and, in particular, relates to a power booster that is not position sensitive and that has a relatively low initial force required to begin travel.

BACKGROUND OF THE INVENTION

Power boosters are well known in the art and are used in applications where human input force must be amplified or boosted to act upon a device that requires a force beyond the normal human ability to provide it. One example is in the operation of a clutch in a large commercial truck. N%le it may be possible for certain drivers to exert sufficient force to disengage the clutch once or twice, typically, the clutch force is high enough that the repeated application of such force, as is required in regular driving of the truck, is a burden that is not easily borne by the driver. Also, the requirement of high force to operate the clutch would limit the available pool of truck drivers. Through use of a power booster the input force to the booster can be kept at a more comfortable and attainable range while the amplified output force from the power booster is used to operate the clutch.

A similar concept is shown in U.S. Pat. No. 3,113,489 to Cruse et al. Cruse et al. provide a servomotor that acts to amplify an input force. However, the arrangement of the valving in the Cruse et al. servomotor is such that the pressurized air used to act on the main piston also acts on the valve member that must be moved to allow such air to reach the main piston. The Cruse et al. arrangement requires that, in order to actuate the valve to begin airflow to the main piston, the force of the air must first be overcome. This produces a relatively high initial bias force that must be overcome before the power booster begins to act.

It is, therefore, an object of the present invention to provide a power booster that amplifies mechanical input force in which the amplification factor is not sensitive to the position of the piston.

It is also an object of the invention to provide a power booster that has a minimum bias force that must be initially overcome to initiate booster action.

It is another object of the invention that the power booster include a mechanical linkage that can transfer force between the input and output of the booster, even in the event of a failure in supply of pressurized fluid, so that the power booster is operable, albeit without force amplification.

SUMMARY OF THE INVENTION

In accordance with the above-stated objects, the present invention provides a fluid-operated mechanical power amplifier. The power amplifier includes a housing that has a main bore formed therein and a main piston slidably mounted within the bore. The bore is closed at a first end to form a main chamber between the end cap and the main piston.

The main piston has a secondary bore formed coaxially with the main bore opposite the main chamber. A second end cap is mounted in the second end of the main piston within the secondary bore to close the bore and define a regulating chamber. The regulating piston is slidably mounted within the regulating chamber formed by the secondary bore.

An input shaft is aligned with the axis of the main bore and the shaft is attached at a first end to the regulating piston, passing through the end cap in the secondary bore. A passageway is formed in the main piston in communication with both the main chamber and the regulating chamber, and a valve means is connected to the first end of the input shaft that is operable to regulate the flow of working fluid through the passageway formed through the input shaft and the control passageway in order to allow working fluid to flow into the main chamber and regulating chamber.

A bias spring is mounted within the regulating chamber, preferably surrounding the input shaft, and the bias spring maintains a bias force that keeps the regulating piston spaced from the second end cap. An output shaft is connected to the main piston and passes through the first end cap in sealed relationship.

The operation of the power amplifier is such that movement of the input shaft relative to the main piston caused by an input force operates the control valve means to allow the flow of working fluid into the main chamber and regulating chamber. The input force must be sufficient to overcome the bias force produced by the bias spring to allow the regulating piston to move toward the second end cap. The working fluid in the main chamber forces the main piston to move, carrying with it the output shaft. The ratio of surface area of the main piston to the regulating piston determines the amount of amplification of force from input to output shaft.

BRIEF DESCRIPTION OF THE DRAWINGS

The invention herein is best understood by those of ordinary skill in the art and others upon reading the ensuing specification, when taken in conjunction with the appended drawing, wherein:

FIG. 1 is a cross-sectional view of one embodiment of a power booster made in accordance with the principles of the present invention.

DETAILED DESCRIPTION OF THE PREFERRED EMBODIMENT

FIG. 1 shows one embodiment of a power booster made in accordance with the principles of the present invention. The illustrated embodiment is a pull-type device in which the input force pulls against the input shaft and a pulling force is transferred to the output shaft to pull against a working device. The invention can be adapted to a push-type device and can be used in back-to-back relation in a common cylinder to produce a push/pull power booster. Also, the booster described herein is described as a pneumatic device that uses pressurized air as the working fluid. It would also be possible to utilize the same principles in a power booster that was operated by other fluids, such as hydraulic oil.

The power booster includes a main piston 10 that is slidably mounted within the cylinder wall 12. The main piston has an indentation formed in its outer surface and is surrounded by a sleeve 14 that cooperates with the indentation on the outer surface of the main piston 10 to form a passageway 16. A coaxial bore 18 is formed in the main piston 10 and the passageway 16 is in communication with the bore 18 through an aperture 20 formed in the main piston.

A regulating piston 22 is mounted within the bore 18 and an input shaft 24 passes through the regulating piston 22. The input shaft 24 is affixed to the regulating piston 22 so that movement of the input shaft will carry with it the regulating piston 22. The input shaft 24 has a fluid passageway formed axially down its length and it is through this passageway that the pressurized fluid, in this case air, is introduced to the power booster. A capping plug 26 is inserted into the bore 18 and surrounds the shaft 24 in sealed relationship to plug the end of the bore 18 to form the bore into a regulating chamber. A compression spring 28 is mounted within the regulating chamber between the regulating piston 22 and the capping plug 26. A rigid sleeve 29 is placed around the input shaft 24 within the regulating chamber. The sleeve 29 is slightly shorter than the bias spring 28 so that the regulating piston 22 can move slightly toward the capping plug 26 before it is stopped by the sleeve 29. An output shaft 30 is coaxially mounted within the cylinder wall 12 and passes through an end cap 32 that is affixed to the cylinder wall 12. The output shaft 30 is inserted into a bore formed in the end of the main piston 10 so that, as the main piston slides within the cylinder wall 12, the output shaft 30 travels along with it. An exhaust bore 34 is coaxially formed in a first end of the output shaft 30 and a counterbore of larger diameter is coaxially formed, also in the first end of the shaft 30. A poppet valve 38 is mounted in the counterbore 36 and is seated against a valve seat 40. A fluted portion 38a of the poppet 38 abuts the end of a valve spring 44 that is mounted in the counterbore 36 between the poppet and the end of the counterbore and acts to bias the poppet valve against the valve seat 40. The exhaust bore 34 in the output shaft 30 is in communication with a vent opening 46 formed in the side of the output shaft. A second valve member 48 is mounted at the end of the input shaft 24 and has a bore formed therein coaxial with the bore through the input shaft 24. The valve member 48 abuts an end surface of the poppet 38 and, in its static condition, seals the end of the valve member 48 against the poppet 38 so that air will not flow through the input shaft 24 and out the end of the valve member 48. The bore in valve member 48 is of very small diameter. The diameter is so small that a minimum force is required to keep the valve member pressed in sealed relationship against the end of poppet 38. Therefore, the bias spring 28 can be of minimum force even though the air pressure can be in the range of 130 psi. In one embodiment, the bore in valve member 48 is only 0.08 inch. A valve control passageway 50 is formed through the main piston from the chamber surrounding the valve member 48 and is in communication with both the passageway 16 and a working chamber 51 defined by the interior of the cylinder wall beyond the main piston 10.

A second end cap 52 is affixed to a second end of the cylinder wall 12 in sealing relationship to form the interior of the cylinder wall 12 into a closed chamber.

In operation, an input force is applied to the input shaft 24 to pull the input shaft to the left, as viewed in FIG. 1 and as shown by the arrow 54. When the input force is sufficient to overcome the force of spring 28, spring 28 will compress and allow the input shaft 24 to move the regulating piston 22 to the left, pulling valve member 48 away from its abutting position against poppet 38 and allow control fluid, in this case high-pressure air, to move through the interior of the shaft 24 and into the passageway 50. Pressurized air therefore travels through the passageway 50 to the working chamber 51 within the cylinder wall to the right of the main piston 10 and, at the same time, through passageway 16 and aperture 20 into the regulating chamber formed by the bore 18.

Since the surface area of the main piston 10 is larger than the area of the regulating piston 22, the pressurized air will force the main piston to the left, carrying with it the output shaft 30 as shown by arrow 56. The amplification factor between the input force and output force is determined by the ratio of the effective areas of the regulating piston and the main piston. As the pressurized air enters the regulating chamber, an equilibrium will be set up between the force of the air within the regulating chamber and the input force on the input shaft 24. The same air pressure that is exerted against the main piston results in a force boost to the output shaft 30.

When the input force is decreased, the pressurized air within the regulating chamber will force the regulating piston 22 to the right, pushing the valve member 48 against the poppet 38, moving the poppet 38 away from the valve seat 40, allowing air to escape from the working chamber 51 and the regulating chamber and through the output shaft 30 and the vent hole 46 to the atmosphere, thereby reducing the output force. As this occurs, however, there will be a continuing balance of forces between the input shaft and the regulating piston due to the pressurized air within the regulating chamber.

The initial force required to begin the booster operation is determined by the strength of the spring 28. Since the airflow cannot begin until valve member 48 moves from its position abutting poppet 38, it is necessary for the input force on the input shaft 24 to be sufficient to overcome the force of spring 28 in order to compress that spring and allow the regulating piston 22 to move to the left, as pictured in FIG. 1. As mentioned earlier, the bias spring 28 must have sufficient force to maintain the valve member 48 in sealed relationship to poppet 38. The small size of the bore in the valve member 48 allows the bias spring force to be a minimum. Unlike the valve arrangement shown in the Cruse et al. patent referred to above, the only force initially acting to maintain input shaft 24 in its original position is the force of spring 28 so that, by adjusting the spring 28, the initial bias force required to begin booster operation can be adjusted to meet the particular needs of the situation. As stated earlier, in the Cruse et al. patent, the initial input force must overcome not only the spring action but also must work against the pressure of the working fluid and must overcome both in order to begin booster action. The present invention, therefore, allows for a much greater control of bias force and a minimization of the bias force.

In the event that there is a failure of pressurized fluid, either due to a leak in the system or failure of the supply, there is sufficient mechanical linkage between the input and output shafts such that the output shaft can be moved strictly by the force applied to the input shaft without power boost. As the input shaft is pulled with no pressurized fluid, the regulating piston will compress spring 28 until piston 22 contacts the sleeve 29, which, in turn, will provide a force against the capping plug 26 to drag the input shaft and regulating piston to the left, moving with it the main piston 10 and, in turn, the output shaft 30. In this mode, since there is no power boost, the working device attached to the output shaft 30 will be moved only if the input force is sufficient to overcome the resistance of the working device. However, since the output shaft can be moved in the absence of working fluid, the design provides a fail-safe system. This is useful in the situation where, for example, the system is being used to apply brakes to a vehicle so that the brakes will be applied even though in an inefficient and difficult manner.

As stated earlier, the illustrated embodiment of the power booster of the present invention is arranged to be what is known in the art as a "pull device"; it would be possible to arrange the internal configuration of the main piston and regulating piston in order to provide a push device in which the input shaft would be pushed and would, in turn, push the output shaft, while maintaining the same regulation and minimum bias force advantages of the present invention. In addition, the devices could be used back to back in a common cylinder in order to provide a push/pull device in which there would be a power boost in both directions if the need arises. It should further be noted that the present invention is described in terms of a pneumatic device using pressurized air as the working fluid. The same principles would apply to a device constructed of materials sufficient to withstand hydraulic oil pressure so that the device could also be used with a liquid, such as hydraulic oil, as the working fluid. Since changes can be made to the illustrated embodiment, while remaining within the spirit and scope of the present invention, the present invention should be defined solely with reference to the appended claims.

The embodiments of the invention in which an exclusive property or privilege is claimed are defined as follows:

1. A fluid-operated mechanical power amplifier for multiplying the input force applied to the power amplifier comprising:
   a housing having a main bore formed therein;
   a main piston slidably mounted within said main bore;
   a first end cap mounted on said housing and defining a working chamber between said first end cap and a first end of said main piston;
   a secondary bore formed within said main piston coaxial with said main bore;
   a second end cap mounted in a second end of said main piston in said secondary bore to close said bore and define a regulating chamber;
   a regulating piston slidably mounted in said secondary bore;
   an input shaft aligned with the axis of said main bore, said shaft attached at a first end to said regulating piston, said shaft having an axial passageway formed therethrough in communication with a source of pressurized fluid, said input shaft extending in sealed relationship through said second end cap;
   a control passageway formed in said main piston in communication with both said working chamber and said regulating chamber;
   a control valve means connected to said first end of said input shaft and operable to control flow of pressurized fluid from said axial passageway to said control passageway, said control valve means constructed and arranged to prevent flow of pressurized fluid into said secondary bore until said regulating piston begins to move and then to allow said pressurized fluid into said main bore to assist movement of said main piston in the direction of said input force;
   a bias spring within said regulating chamber, said bias spring providing the sole bias force to keep said regulating piston spaced from said second end cap; and
   an output shaft connected to said main piston and extending in sealed relationship through said first end cap.

2. The mechanical power amplifier of claim 1, wherein said control valve means includes:
   a tube connected at a first end to said regulating piston, said tube having a small diameter bore formed axially therein in alignment with said axial passageway;
   a flat seating surface associated with said main piston, a second end of said tube abutting said flat seating surface to form a fluid tight seal, said control valve means operable upon movement of said input shaft in a first direction to move said second end of said tube away from said flat seating surface to allow fluid flow into said control passageway.

3. The mechanical power amplifier of claim 2, further including an exhaust bore formed in said output shaft; and
   exhaust valve means in communication with said exhaust bore operable to provide fluid flow from said main chamber to said exhaust bore.

4. The mechanical power amplifier of claim 1, wherein said main piston has an indentation formed on an exterior surface thereof and further including a sleeve surrounding said main piston to form a portion of said control passageway between said sleeve and said indentation.

5. The mechanical power amplifier of claim 1, further including mechanical linkage means between said input shaft and said output shaft.

6. The mechanical power amplifier of claim 3, wherein said exhaust valve means is in communication with said control passageway and said exhaust bore.

7. The mechanical power amplifier of claim 3, wherein said exhaust valve means includes a poppet valve operated by movement of said input shaft.

8. The mechanical power amplifier of claim 7, wherein said flat seating surface is formed on said poppet valve.

* * * * *